United States Patent
Aeberhard et al.

(10) Patent No.: US 11,371,734 B2
(45) Date of Patent: Jun. 28, 2022

(54) METHOD AND COMPUTER SYSTEM FOR MONITORING AN HVAC SYSTEM WITH DATA FROM A PLURALITY OF HVAC CONTROLLERS

(71) Applicant: BELIMO HOLDING AG, Hinwil (CH)

(72) Inventors: Ronald Aeberhard, Grut (CH); Reto Anliker, Schonholzerswilen (CH); Stefan Mischler, Wald (CH); Frauke Oldewurtel, Zurich (CH); Forest Reider, Wetzikon ZH (CH); Peter Schmidlin, Uster (CH); Marc Steiner, Einsiedeln (CH); Marc Thuillard, Uetikon am See (CH)

(73) Assignee: BELIMO HOLDING AG, Hinwil (CH)

( * ) Notice: Subject to any disclaimer, the term of this patent is extended or adjusted under 35 U.S.C. 154(b) by 15 days.

(21) Appl. No.: 16/099,304

(22) PCT Filed: May 31, 2017

(86) PCT No.: PCT/EP2017/063166
§ 371 (c)(1),
(2) Date: Nov. 6, 2018

(87) PCT Pub. No.: WO2017/207634
PCT Pub. Date: Dec. 7, 2017

(65) Prior Publication Data
US 2019/0212022 A1 Jul. 11, 2019

(30) Foreign Application Priority Data

Jun. 3, 2016 (CH) .................... 00714/16

(51) Int. Cl.
*F24F 11/30* (2018.01)
*F24F 11/64* (2018.01)
(Continued)

(52) U.S. Cl.
CPC .............. *F24F 11/30* (2018.01); *F24F 11/52* (2018.01); *F24F 11/54* (2018.01); *F24F 11/58* (2018.01);
(Continued)

(58) Field of Classification Search
CPC .. F24F 11/30; F24F 11/54; F24F 11/89; F24F 11/65; F24F 11/64; F24F 11/52;
(Continued)

(56) References Cited

U.S. PATENT DOCUMENTS

| 6,702,767 B1 | 3/2004 | Douglas et al. |
| 2005/0103874 A1* | 5/2005 | Erdman ................... F24F 11/30 236/51 |

(Continued)

FOREIGN PATENT DOCUMENTS

| EP | 2 056 031 A1 | 5/2009 |
| EP | 2 937 638 A2 | 10/2015 |

OTHER PUBLICATIONS

Search Report for Switzerland Application No. 7142016, dated Sep. 2, 2016.
(Continued)

*Primary Examiner* — Darrin D Dunn
(74) *Attorney, Agent, or Firm* — Sughrue Mion, PLLC

(57) ABSTRACT

For monitoring an HVAC system (1), HVAC data reporting messages are received and stored in a cloud-based computer system (4). Each HVAC data reporting message includes one or more operation data values included by an HVAC controller (22) of the HVAC system (1). The cloud-based computer system (4) generates (S73) remote diagnoses for a
(Continued)

particular HVAC device, using a plurality of HVAC reporting messages received from a plurality of the HVAC controllers (22) from one or more HVAC systems (1). Each remote diagnosis is generated (S73) by using more than one operational data value, included in HVAC reporting messages received (S71) received from HVAC controllers (22) of more than one HVAC systems (1) and/or from at least two different types of operational data values. A diagnosis message which includes a remote diagnosis is transmitted to a diagnosis processing system for the particular HVAC device.

14 Claims, 5 Drawing Sheets

(51) Int. Cl.
*F24F 11/54* (2018.01)
*G05B 19/042* (2006.01)
*F24F 11/89* (2018.01)
*F24F 11/58* (2018.01)
*F24F 11/52* (2018.01)
*F24F 11/65* (2018.01)
*F24F 11/32* (2018.01)
*F24F 140/00* (2018.01)
*F24F 140/20* (2018.01)

(52) U.S. Cl.
CPC .............. *F24F 11/64* (2018.01); *F24F 11/65* (2018.01); *F24F 11/89* (2018.01); *G05B 19/0428* (2013.01); *F24F 11/32* (2018.01); *F24F 2140/00* (2018.01); *F24F 2140/20* (2018.01); *G05B 2219/2614* (2013.01)

(58) Field of Classification Search
CPC ........ F24F 11/58; F24F 11/32; F24F 2140/20; F24F 2140/00; F24F 11/62; F24F 11/38; G05B 19/0428; G05B 2219/2614; G05B 2219/2642; G05B 23/0221; G05B 23/0224; G05B 23/0227; G05B 23/024; G05B 23/0262; G05B 2219/24058
See application file for complete search history.

(56) References Cited

U.S. PATENT DOCUMENTS

| | | |
|---|---|---|
| 2010/0030013 A1 | 2/2010 | Brunelle et al. |
| 2011/0176521 A1* | 7/2011 | Park .................... H04L 45/3065 370/336 |
| 2012/0221150 A1 | 8/2012 | Arensmeier |
| 2013/0297078 A1 | 11/2013 | Kolavennu |
| 2014/0277769 A1 | 9/2014 | Matsuoka et al. |
| 2015/0297778 A1* | 10/2015 | Conroy ................. B05B 7/2416 239/11 |
| 2016/0215996 A1* | 7/2016 | Blair ....................... F24F 11/62 |
| 2016/0313751 A1* | 10/2016 | Risbeck ............. G05D 23/1917 |

OTHER PUBLICATIONS

Written Opinion for PCT/EP2017/063166, dated Jul. 14, 2017.
International Search Report for PCT/EP2017/063166, dated Jul. 14, 2017.
Decision of Grant dated Feb. 1, 2021 from the Russian Federal Service for Intellectual Property in Application No. 2018141586/28.

* cited by examiner

| Full cycles | 351 |
| Changes of direction (partially cycles) | 5395 |
| Operating time [h] | 4150 |
| Active time [h] | 187 |
| Start/Stop ratio [%] | 5 |
| Motor start/stop counter | 1000 |

METHOD AND COMPUTER SYSTEM FOR MONITORING AN HVAC SYSTEM WITH DATA FROM A PLURALITY OF HVAC CONTROLLERS

This Application is a National Stage of International Application No. PCT/EP2017/063166 filed May 31, 2017, claiming priority based on Switzerland Patent Application No. 00714/16 filed Jun. 3, 2016.

FIELD OF THE INVENTION

The present invention relates to a method and a computer system for monitoring an HVAC system. Specifically, the present invention relates to a method and a computer system for monitoring an HVAC system which comprises a plurality of HVAC devices and a plurality of HVAC controllers, each of the HVAC controllers comprising a communication module.

BACKGROUND OF THE INVENTION

In the field of Heating, Ventilation, Air Conditioning, and Cooling (HVAC), HVAC systems comprise a fluid transportation system and a plurality of HVAC devices, including motorized HVAC devices, such as actuators, valves, dampers, pumps, and fans, and other devices connected to the HVAC system, such as flow senses, pressure sensors, temperature sensors, rotation sensors, position sensors, humidity sensors, etc. In addition to an electric motor, motorized HVAC devices or HVAC actuators, respectively, are typically provided with a controller having a processing unit and a data store for storing configuration data for operating the HVAC device, and for recording operation-related data by the HVAC device. In the field of HVAC, the electric motor is coupled, through gears and/or other mechanical coupling, to a valve or damper for controlling the flow of a fluid such as water or air. The configuration data includes configuration parameters such as motor speed, closing time, opening time, etc. The operation-related data includes values such as number of cycles, number of movements, maximum travel angle, minimum travel angle, etc. In HVAC applications, the controller is connected to sensors, such as flow sensors, pressure sensors, temperature sensors, rotation sensors, position sensors, etc., and the configuration data further includes configuration parameters such as a target value of flow rate, a set value of altitude for adjusting the measurement of a flow sensor, etc. Moreover, a section of the data store further has stored therein program code for controlling the processing unit. In HVAC applications, the program code includes various control algorithms for controlling the motor to open and close an orifice of the value or damper to regulate the flow of fluid e.g. with regards to differential pressure, room temperature, flow of energy, etc. Although the storing of configuration data, program code, and/or operation-related data would make possible flexible management and operation of HVAC systems and their actuators and other HVAC devices, the actual management and operation of HVAC systems and their actuators and other HVAC devices is typically not as advanced as it could be. The reasons for this include the facts that the HVAC actuators and other HVAC devices are typically installed in locations which are not often accessed and/or are not easily accessible, they are not always connected to a communication network, and most importantly, even when an operator has access to the configuration and operation-related data of an HVAC actuator or another HVAC device, it is very difficult, if not impossible, to assess from this data whether the HVAC actuator or other HVAC device is operating properly and within specified conditions, whether there is problem with regards to the electrical and mechanical condition and operation of the HVAC actuator or other HVAC device, or their actual application and performance, or whether the actuator or some of its attached components and other HVAC devices need to be reconfigured or even replaced, because the answers to these questions depend on further factors, such as current and past environmental conditions (e.g. humidity, temperature), past performance and load of the specific HVAC actuator or other HVAC device, and past performance history with the particular type of HVAC actuator or other HVAC device. Thus, it would be desirable to improve the actual monitoring of HVAC systems, whereby the term "monitoring of an HVAC system" is not limited to merely observing behavior and performance of an HVAC system and its actuators and other HVAC devices, but also includes enabling and drawing qualified conclusions with respect to performance and/or conditions of a particular actuator or other HVAC device.

SUMMARY OF THE INVENTION

It is an object of this invention to provide a method and a computer system for monitoring an HVAC system, which method and computer system do not have at least some of the disadvantages of the prior art. In particular, it is an object of the present invention to provide a method and a computer system for monitoring an HVAC system and its HVAC actuators and other HVAC devices, which method and computer system do not have at least some of the disadvantages of the prior art.

According to the present invention, these objects are achieved through the features of the independent claims. In addition, further advantageous embodiments follow from the dependent claims and the description.

An HVAC system comprises a plurality of HVAC devices and a plurality of HVAC controllers. Each of the HVAC controllers comprises a communication module. Examples of HVAC devices include motorized HVAC devices, such as actuators, valves, dampers, pumps, and fans, and other, non-motorized devices associated with the HVAC system, such as sensors.

According to the present invention, the above-mentioned objects are particularly achieved in that for monitoring the HVAC system, HVAC data reporting messages are received and stored in a cloud-based computer system. Each HVAC data reporting message includes one or more operational data values included by one of the HVAC controllers. The cloud-based computer system generates remote diagnoses for a particular HVAC device of the HVAC system, using a plurality of HVAC data reporting messages received from a plurality of the HVAC controllers from one or more HVAC systems. Each remote diagnosis is generated by using more than one operational data value. The cloud-based computer system transmits a diagnosis message to a diagnosis processing system for the particular HVAC device. The diagnosis message includes a remote diagnosis for the particular HVAC device.

In an embodiment, the cloud-based computer system generates the remote diagnosis for the particular HVAC device by using operational data values included in HVAC data reporting messages received from HVAC controllers of more than one HVAC systems.

In a further embodiment, the HVAC controllers include in the HVAC data reporting messages at least two different types of operational data values. The cloud-based computer system generates the remote diagnosis for the particular HVAC device by using at least the two different types of operational data values from the HVAC controllers.

In an embodiment, the HVAC controllers include in the HVAC data reporting messages sensor measurement values from at least two different sensors connected to the respective HVAC controller. The cloud-based computer system generates the remote diagnosis for the particular HVAC device by using sensor measurement values from at least two different sensors connected to the HVAC controller.

In a further embodiment, the cloud-based computer system determines location information for the HVAC devices. The cloud-based computer system generates the remote diagnosis for the particular HVAC device by further using location information of the HVAC devices.

In an embodiment, the cloud-based computer system generates one or more HVAC device group reference values, using a plurality of data reporting messages received from a plurality of HVAC controllers of a plurality of HVAC systems. The cloud-based computer system generates the remote diagnosis for the particular HVAC device by using at least one of the HVAC device group reference values and at least one HVAC data reporting message related to the particular HVAC device.

In a further embodiment, the cloud-based computer system determines HVAC device benchmark data indicative of functional performance levels of the HVAC devices, using a plurality of the HVAC data reporting messages received from a plurality of HVAC controllers of a plurality of HVAC systems. The cloud-based computer system determines an individual performance indicator for the particular HVAC device, using the HVAC device benchmark data and at least one HVAC data reporting message related to the particular HVAC device. The cloud-based computer system transmits a diagnosis message to a diagnosis processing system for the particular HVAC device, depending on the individual performance indicator of the particular HVAC device.

In an embodiment, the cloud-based computer system determines for the HVAC devices performance thresholds which define expected normal operations of the HVAC devices, using a plurality of HVAC data reporting messages received from a plurality of HVAC controllers of a plurality of HVAC systems. The cloud-based computer system identifies a particular HVAC device which operates outside the expected normal operations defined by the performance thresholds, using one or more HVAC data reporting messages related to the particular HVAC device. The cloud-based computer system generates and transmits an abnormal operations alert message to the diagnosis processing system responsible for the particular HVAC device.

In a further embodiment, the cloud-based computer system determines operational end-of-life expectancies for HVAC device components of the HVAC devices or for HVAC device components connected to the HVAC devices, using a plurality of HVAC data reporting messages received from a plurality of HVAC controllers of a plurality of HVAC systems. The cloud-based computer system identifies an HVAC device component which has reached its operational end-of-life expectancy, using one or more HVAC data reporting messages related to the HVAC device comprising or being connected to the respective HVAC device component. The cloud-based computer system generates and transmits an end-of-life alert message to a diagnosis processing system responsible for the respective HVAC device component or HVAC device.

In an embodiment, the cloud-based computer system detects oscillation of control or feedback signals, using a plurality of HVAC data reporting messages received from HVAC controllers of a particular HVAC system. Upon detection of oscillation, the cloud-based computer system determines control parameters for attenuating the oscillation and transmits the control parameters to one or more HVAC controllers of the particular HVAC system.

In a further embodiment, the cloud-based computer system generates control values for the particular HVAC device, using a plurality of data reporting messages received from a plurality of HVAC controllers. Each control value is generated by using more than one operational data value. The cloud-based computer system transmits a control message to the particular HVAC device, the control message including a control value for the particular HVAC device.

In an embodiment, at least some of the operational data values relate to operational parameters of an electric motor of an HVAC actuator, the operational parameters of the electric motor relating to: motor current of the electric motor, voltage levels of a power supply of the electric motor, temperature of the electric motor, and/or movement of the electric motor. The operational parameters of the electric motor relating to movement include: number of rotations, number of changes of direction, powered-on operating time, active operating time, number of starts, number of stops, and/or start/stop ratio.

In a further embodiment, at least some of the operational data values relate to positions of actuated parts actuated by HVAC actuators.

In an embodiment, at least some of the operational data values relate to sensor measurements values regarding a fluid moving through a valve controlled by an HVAC actuator, including: flow rate, temperature values, and/or differential pressure values.

In addition to a method for monitoring an HVAC system: the present invention also relates to a computer system for monitoring an HVAC system. The computer system is a cloud-based computer system and comprises one or more processors configured to: receive and store in the cloud-based computer system HVAC data reporting messages from the plurality of HVAC controllers, each HVAC data reporting message including one or more operational data values included by the respective controller; generate remote diagnoses for a particular HVAC device of the HVAC system, using a plurality of HVAC data reporting messages received from a plurality of the HVAC controllers from one or more HVAC systems, wherein each remote diagnosis is generated by using more than one operational data value; and transmit a diagnosis message to a diagnosis processing system for the particular HVAC device, the diagnosis message including a remote diagnosis for the particular HVAC device.

In an embodiment, the method is directed to monitoring a plurality of HVAC actuators, each of the HVAC actuators comprising an electric motor, a controller, and a communication module, actuator data reporting messages are received and stored in a cloud-based computer system. Each actuator data reporting message includes one or more operational data values from the controllers of the HVAC actuators. The cloud-based computer system generates remote diagnoses for a particular one of the HVAC actuators, using a plurality of data reporting messages received from a plurality of the HVAC actuators. Each remote diagnosis is generated by using more than one operational data value. The cloud-based computer system transmits a diagnosis message to a diagnosis processing system for the particular one of the HVAC actuators. The diagnosis message includes a remote diagnosis for the particular one of the HVAC actuators. In an embodiment, the cloud-based computer system generates the remote diagnosis for the particular one of the HVAC actuators by using operational data values included in data reporting messages received from more than one of the HVAC actuators.

In addition to a method and a cloud-based computer system for monitoring an HVAC system and/or a plurality of HVAC actuators, the present invention also relates to an HVAC actuator, comprising an electric motor, a controller, and a communication module, wherein the controller is configured to: determine and store in a data store of the respective controller one or more operational data values; generate actuator data reporting messages, each actuator data reporting message including at least one of the operational data values; transmit the actuator data reporting messages from the HVAC actuator addressed to a cloud-based computer system using the communication module of the HVAC actuator; and receive from the cloud-based computer system a diagnosis message, the diagnosis message including a remote diagnosis generated by the cloud-based computer system for the HVAC actuator from more than one operational data value, using a plurality of data reporting messages from a plurality of HVAC actuators.

In addition, the present invention also relates to a method and a cloud-based computer system for monitoring a plurality of HVAC actuators, each of the HVAC actuators comprising an electric motor, a controller, and a communication module. Actuator data reporting messages are received and stored in a cloud-based computer system. The actuator data reporting message include measurement values of a motor current (or motor torque) of the electric motor of an HVAC actuator, and motor movement information. The cloud-based computer system determines system hysteresis for a particular HVAC actuator from a course of the motor current (or motor torque) and the motor movement. The system hysteresis is indicated by a reduced motor current (or motor torque) during directional changes of the motor, until the motor current (or motor torque) increases, upon engaged actuation of an actuated part actuated by the motor. The cloud-based computer system generates remote diagnoses of increased system hysteresis for a particular actuator based on a comparison of the system hysteresis determined for the particular actuator to the system hysteresis determined and recorded in the past for the particular actuator.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
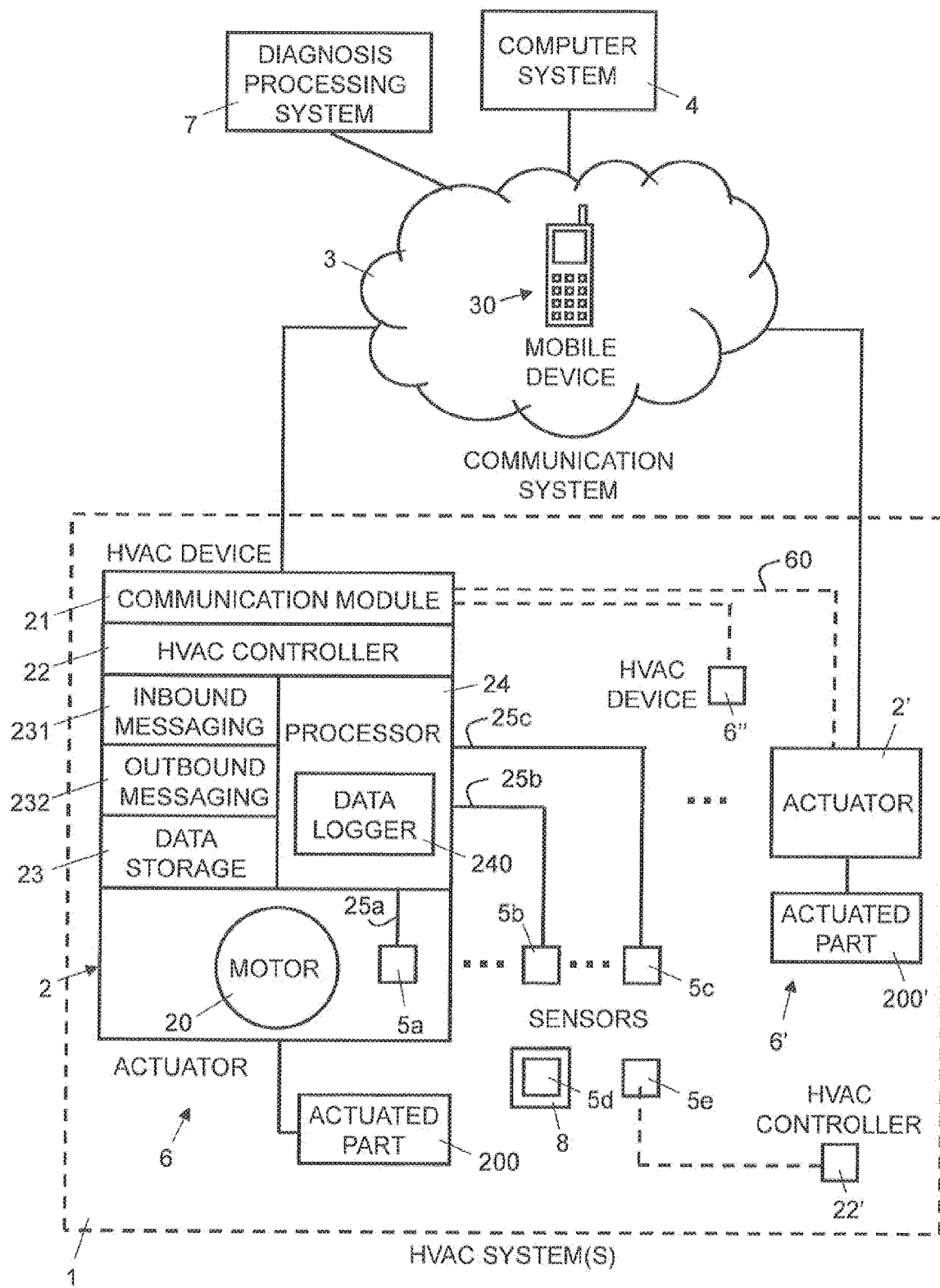
FIG. 1: shows a block diagram illustrating schematically an HVAC system with a plurality of HVAC devices and HVAC controllers communicating with a remote cloud-based computer system via a communication system.
Figure 3:
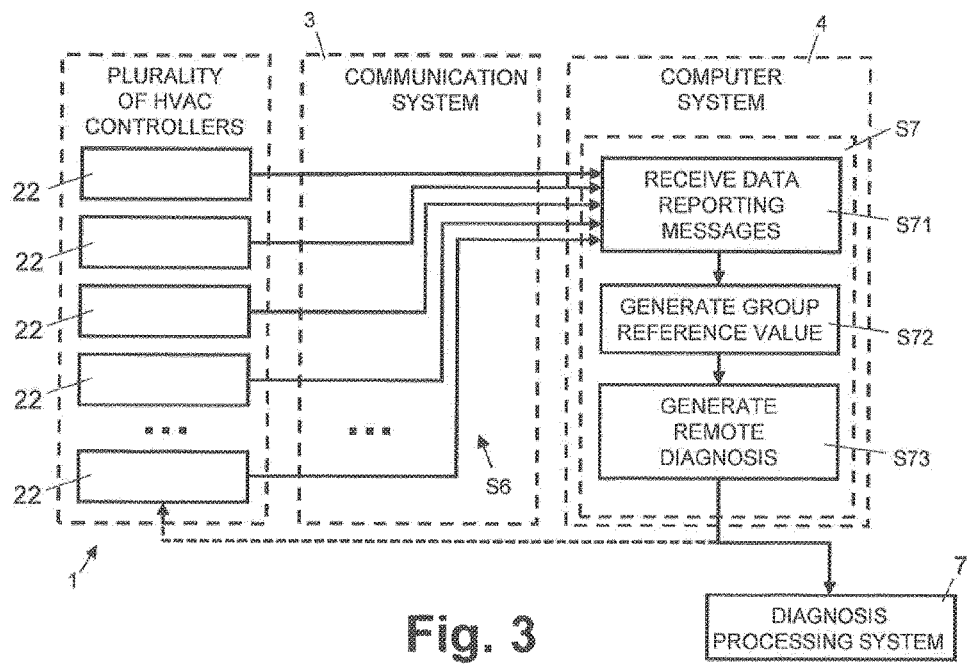
FIG. 3: shows a flow diagram illustrating an exemplary sequence of steps for monitoring an HVAC by generating in a remote cloud-based computer system individual remote diagnoses for a particular HVAC device, using HVAC data reporting messages received from a plurality of HVAC controllers.
Figure 5:
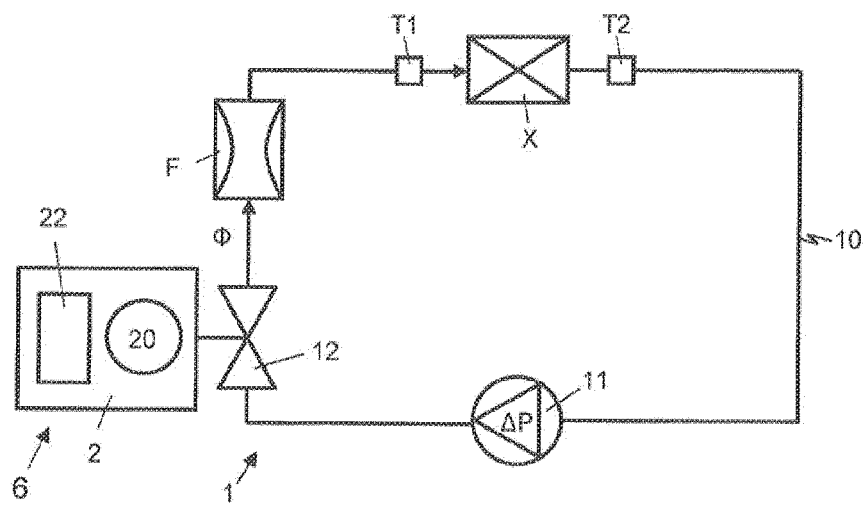
FIG. 5: shows a block diagram illustrating schematically a simplified HVAC system with an HVAC device that includes an actuated valve for regulating the flow of fluid through a fluid transportation line, and sensors for measuring flow rate and temperatures of the fluid.

In FIGS. 1, 3, and 5, reference numeral 1 refers to one or more HVAC systems. The HVAC systems 1 include fluid transporting systems 10, including air ducts and/or pipes for transporting a fluid, e.g. water or air, to a one or more zones, e.g. enclosed spaces or rooms in a building, for the purpose of heating, ventilating, cooling, and/or air conditioning (HVAC). The HVAC systems 1 further comprise a plurality of HVAC devices 6, 6', 6", including motorized HVAC devices, such as actuators 2, 2', valves 12, dampers, pumps 11, and fans, and other devices connected to the HVAC system 1, such as sensors 5a, 5b, 5c, 5d, 5e including flow sensors F, pressure sensors, temperature sensors T1, T2, rotation sensors, position sensors, humidity sensors, etc. In each of the HVAC systems 1, the fluid is moved by way of a drive unit, e.g. a motorized fan or pump 11. The flow φ of fluid into the zones of an HVAC system 1 is adjusted and regulated by motorized valves 12 or dampers arranged in the fluid transporting systems 10. The valves 12 or dampers are driven by respective HVAC actuators 2, 2'.

The HVAC actuators 2, 2' comprise an electric motor 20 and an HVAC controller 22, connected electrically to the respective motor 20. The electric motors 20 are mechanically coupled to an actuated part 200, 200', such as a valve member, e.g. a flap, disc, ball, or a damper blade, for moving the actuated part 200, 200', such as to regulate the orifice of the valve 12 or damper for regulating the flow φ of fluid. Each of the HVAC controllers 22 comprises a processing unit with an electronic circuit configured to control the respective motor 20. Depending on the embodiment, the electronic circuits of the HVAC controllers 22 are implemented as programmed processors, including data and program memory, or another programmable logic unit, e.g. an application specific integrated circuit (ASIC).

As illustrated schematically, in FIG. 1, the HVAC systems 1 may comprise further HVAC controllers 22' which are not necessarily part of an actuator 2, 2' or connected to a motor 20.

As illustrated in FIG. 1, the HVAC controllers 22, 22' or actuators 2, 2' further comprise a communication module 21 configured for data communication with a remote cloud-based computer system 4 via a communication system 3. Depending on the embodiment and/or configuration, the communication system 3 includes a LAN (Local Area Network), a WLAN (Wireless Local Area Network), a mobile radio network, e.g. a GSM (Global System for Mobile Communication) or UMTS (Universal Mobile Telephone System) network, and/or the Internet. In an embodiment, the communication module 21 is configured for near or close range communication, and includes circuits for RFID (Radio frequency IDentifier), NFC (Near Field Communication), Bluetooth, and/or Bluetooth Low Energy communication. In case of near or close range communication, the communication between the near or close range communication module 21 and the remote cloud-based computer system 4 is facilitated by the communication system 3 including one or more mobile devices 30, e.g. a cellular phone, a smart phone, a laptop, notebook or tablet computer, configured to operate as a relay or store and forward device. Specifically, the mobile device 30 is configured to communicate with the communication module 21 through a near or close range communication interface and with the remote cloud-based computer system 4 through 3 mobile radio network or WLAN. More specifically, the mobile device 30 is configured to read or receive from the HVAC controller 22, 22' outbound data messages via the near or close range communication interface and to forward the HVAC controller's outbound data messages via networks of the communication system 3 to the remote cloud-based computer system 4. In reverse direction, the mobile device 30 is configured to receive from the cloud-based computer system 4 data messages for the HVAC controller 22, 22' or HVAC device 6, 6', 6", respectively, via networks of the communication system 3, and to transmit or write the data message via the near or close range communication interface to the HVAC controller 22, 22' where it is stored by the communication module 21 in the inbound messaging storage 231.

In an embodiment, the communication module 21 is further configured to communicate with other HVAC devices 6', 6" and HVAC controller 22', e.g. through a communication bus 60, a LAN and/or a WLAN, as illustrated schematically in FIG. 1. In another embodiment or configuration, a messaging gateway (not illustrated) is connected to the communication bus 60 and configured to facilitate the data communication between the HVAC controllers 22, 22' and the remote cloud-based computer system 4 via the communication system 3.

As illustrated in FIG. 1, the HVAC controllers 22, 22' are connected to various internal and/or external sensors 5a, 5b, 5c, 5d, 5e, e.g. flow sensors F or temperature sensors T1, T2 for measuring flow rate φ and temperature of the fluid at different locations in the transporting system 10, as illustrated in FIG. 5, and/or other sensors for sensing and generating different types operational parameters of the HVAC devices 6, 6', 6" or HVAC actuator 2, 2', e.g. motor current, motor torque, motor voltage levels, motor position, motor speed, motor temperature, motor movement direction, motor rotations, motor movement duration, duration of motor operation, motor turn on/off event or status, etc., or of the HVAC system 1, e.g. system pressure in the transporting system 10, differential pressure of valves 12 and dampers, speed of a pump 11 or fan, positions of actuated parts 200, 200', such as valve or damper positions, rotation angles, orifice degrees, etc. In an embodiment, one or more sensors 5d are integrated in a wearable device 8, e.g. wrist worn device such as a smart watch, which comprises a controller and a communication module configured to transmit HVAC data reporting messages via communication system 3 to the remote cloud-based computer system 4. The HVAC data reporting messages generated and transmitted by the wearable device 8 include the wearer's (user's) personal biometric data, including body temperature, heart rate, galvanic skin response, etc., for assessing the wearer's (user's) comfort level, in combination with time and location information.

The remote cloud-based computer system 4 comprises one or more operable computers with one or more processors and one or more communication modules configured for data communication with the controllers 22, 22' or their communication modules 21, respectively, as well as with wearable devices 8, through the communication system 3 end relaying mobile devices 30, if applicable and/or necessary.

In FIG. 1, reference numeral 7 refers to a diagnosis processing system which comprises one or more operable computers configured for data communication with the cloud-based computer system 4. The diagnosis processing system 7 is implemented as a computer center, e.g. a maintenance center, assigned to a plurality of HVAC devices 6, 6', 6", including HVAC actuators 2, 2' and/or components of the HVAC system 1, and configured to receive from the cloud-based computer system 4 diagnosis messages related to a particular HVAC device 6, 6', 6" or HVAC actuator 2, 2', respectively. Alternatively or in addition, the diagnosis messages are sent by the cloud-based computer system 4 to a mobile device 30 (or another personal computing device) assigned to the particular HVAC device 6, 6', 6" or HVAC actuator 2, 2', respectively, as a diagnosis processing system 7.

Figure 2:
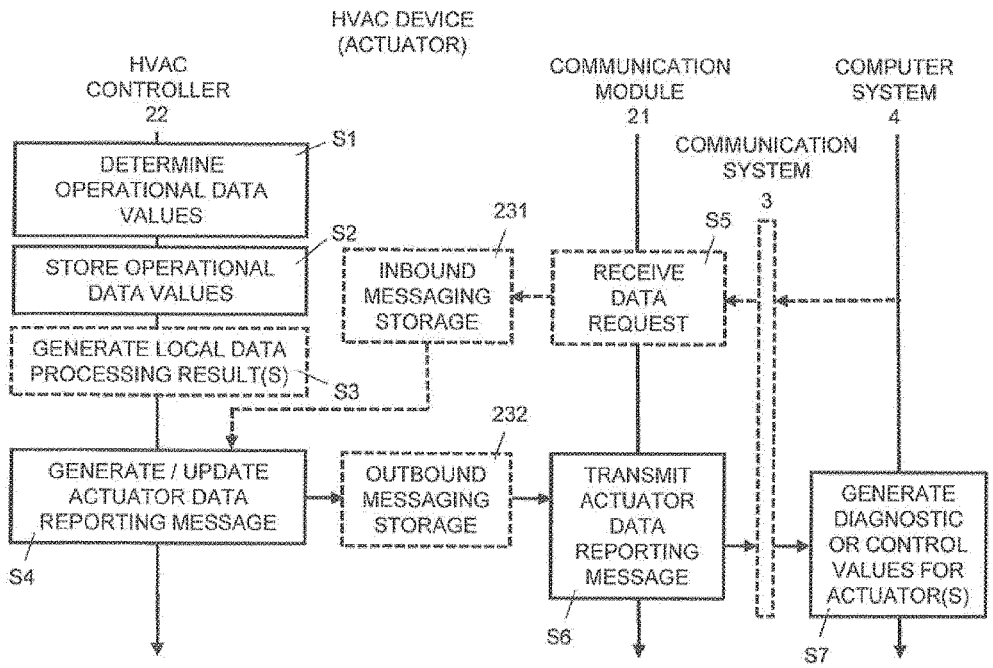
FIG. 2: shows a flow diagram illustrating an exemplary sequence of steps for monitoring an HVAC system by transmitting HVAC data reporting messages from HVAC controllers to a remote cloud-based computer system.
Figure 4:
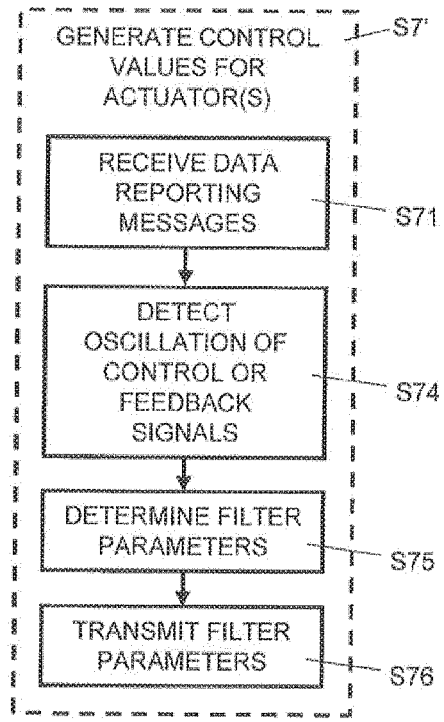
FIG. 4: shows a flow diagram illustrating an exemplary sequence of steps for detecting by a cloud-based computer system oscillation of control or feedback signals in an HVAC system, using HVAC data reporting messages received from a plurality of HVAC controllers.

In the following paragraphs, described with reference to FIGS. 2, 3, and 4, are possible sequences of steps performed by the HVAC controllers 22, 22' of the HVAC devices 6, 6', 6" or HVAC actuators 2, 2', respectively, their communication modules 21, and the processors of the cloud-based computer system 4, for monitoring the HVAC systems 1 and their HVAC devices 6, 6', 6".

As illustrated in FIG. 2, in step S1, the HVAC controller 22 determines operational data values. Particularly, the HVAC controller 22 reads sensor measurement values and determines other operational values as described in more detail below. As illustrated schematically in FIG. 1, for that purpose the HVAC controller 22 has a data logger 240 implemented on its processor 24. The reading of the sensor measurement values from internal and/or external sensors 5a, 5b, 5c, 5e and the determination of other operational data values is executed by the HVAC controller 22 or its data logger 240, respectively, on an ongoing or periodic basis, or upon request from an internal or external control or application program, e.g. an external data request, received in step S5 from the cloud-based computer system 4, a mobile device 30, or another computing device.

In step S2, the HVAC controller 22 or its data logger 240, respectively, stores the operational data values in a local data storage 23, e.g. in a data memory of the HVAC controller 22, HVAC device 6, or HVAC actuator 2, respectively, defined for storing operational data values. Depending on the type of operational data or sensor, respectively, the operational data values are stored with a time stamp including the current date and/or time. Some operational data values are stored as a series in a sequence of consecutive operational data values. The length, i.e. number of entries, of a sequence and/or the sampling period (sampling frequency) depend on the particular type of sensor or operational data value and the amount of memory available at the HVAC device 6, 6', 6", HVAC controller 22, 22' or HVAC actuator 2, 2', respectively. To conserve memory space, some operational data values, particularly sensor measurement values, are stored only, if their value exceeds a stored maximum value and/or if it is below a stored minimum value of the respective type of operational data value or sensor, whereby the stored minimum and maximum values are predefined threshold values or previously determined and recorded operational data values. Examples of different types of operational data values, sensor measurement values, data and measurement sequences and maximum/minimum values include flow rates φ, fluid entry temperatures T1, fluid exit temperatures T2, differential pressure values (e.g. over air filter, valves, etc.), glycol concentration in fluid, motor current, motor torque, torque at end stops, motor voltage levels (reached minimum and maximum voltage levels), motor position, motor torque or current values at specific positions or position ranges, motor speed, motor temperature, motor movement direction, motor movement duration, differential pressures at valves and dampers, speed of a pump or fan, power of pump or fan, valve or damper positions, positions of other actuated parts, humidity, temperature of printed circuit board (PCB) (reached minimum and maximum temperature levels), and/or state of supercap. Other operational data values are stored as an accumulated value (running total), for example, duration of motor operation, or the occurrence of specific events or actions are counted in respective counters, e.g. number of motor movements, number of motor rotations, number of motor turn on/off events, number of power failures, number of watching resets, number of watchdog activations, number of firmware changes, number of configuration changes, number of changes of direction of the motor, number of movements to end stop, number of movements to end stop under overload, and/or the number of overload events, specifically, the number of events when the motor temperature exceeds a motor threshold temperature, when the motor current exceeds a motor current threshold, and/or when the actuator power exceeds a maximum actuator power. For lifecycle control, as one-time events, a bit is set in the HVAC controller 22 when the actuator 2 has passed quality tests after manufacturing, another bit is set by the controller 22 at the first time when the HVAC actuator 2 is connected to power, in the field, i.e. after the quality tests. Moreover a counter is provided for representing the actuator's 2 total duration of operation, in increments of several hours, e.g. every three hours.

Figures 7, 8:
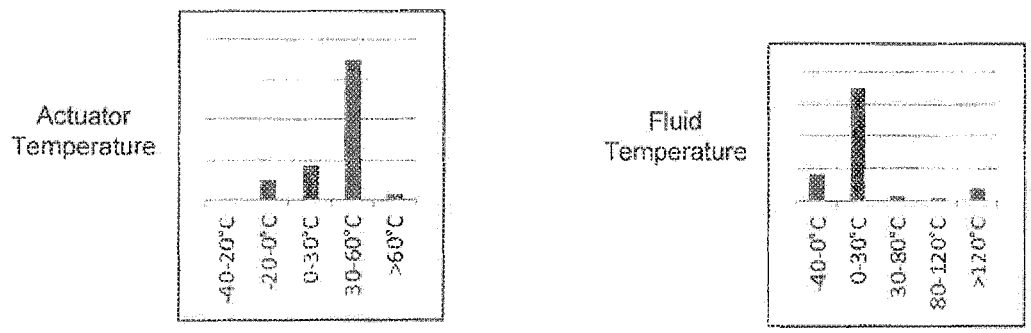
FIG. 7: shows a chart with a histogram illustrating the frequency distribution of actuator temperature value ranges.
FIG. 8: shows a chart with a histogram illustrating the frequency distribution of fluid temperature value ranges.
Figures 9, 10:
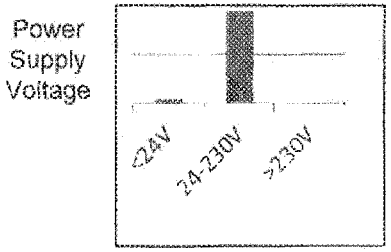
FIG. 9: shows a table of performance indicators related to actuator movement.
FIG. 10: shows a chart with a histogram illustrating the frequency distribution of power supply voltage value ranges.

In optional step S3, the HVAC controller 22 generates and stores in the local data storage 23 one or more local data processing results. Each local data processing result is generated by the HVAC controller 22 from several operational data values stored in the local data storage 23 and read from one or more sensors 5a, 5b, 5c of the HVAC actuator 2 or connected to the HVAC actuator 2. Examples of local data processing results include average values, minimum values, maximum values, value histograms, accumulations of values, differences of values, deviations of values from threshold, minimum, maximum or average values, of stored operational data values. The local data processing results are non-diagnostic data values, i.e. they are calculated as raw data values without any diagnostic content or meaning. Specifically, examples of local data processing results include histograms of motor torque, motor current, motor voltage, of motor torque values at different pre-defined positions of an actuated part 200, motor temperature, actuator temperature, PCB temperature, humidity level, voltage and/or current levels of motor's power supply, and/or fluid temperature; and/or accumulated values of number of full motor cycles, number of motor directional changes (partial cycles), total motor operating time, total motor active time (movement), start/stop ratio (percentage), number of start/stop events, and/or estimated duration of power interruptions. For example, FIG. 7 shows a chart with a histogram illustrating the frequency distribution of actuator temperature value ranges; FIG. 8: shows a chart with a histogram illustrating the frequency distribution of fluid temperature value ranges; FIG. 9 shows a table of performance indicators related to actuator movement; and FIG. 10 shows a chart with a histogram illustrating the frequency distribution of power supply voltage value ranges.

In step S4, the HVAC controller 22 generates an HVAC data reporting message including one or more operational data values determined and stored by the HVAC controller 22 or its data logger 240, respectively, in the local data storage 23. Depending on the embodiment, an HVAC data reporting message may further include one or more of the non-diagnostic local data processing results. The generating of the HVAC data reporting message is executed on an ongoing or periodic basis or upon request from an internal or external control or application program, e.g. an external data request, received in step S5 from the cloud-based computer system 4, a mobile device 30, or another computing device. In an embodiment, the HVAC controller 22 stores the HVAC data reporting message in the outbound messaging storage 232 for communication to the remote cloud-based computer system 4. The HVAC data reporting message is addressed to the cloud-based computer system 4. In an embodiment, the HVAC data reporting message comprises a variable part which includes a defined set of different operational data values, including sensor measurement values, counter values, and other operational data, and optionally local data processing results. Stored in the outbound messaging storage 232, the variable part of the HVAC data reporting message is continuously or periodically updated by the HVAC controller 22. In an embodiment, the HVAC data reporting message further comprises a static part which includes device identification information, e.g. actuator identification information, such as a serial number and actuator type or model indicators, and configuration data, e.g. version numbers of circuits, firmware, software, installed software components, etc.

In step S6, the communication module 21 communicates the HVAC data reporting message via the communication system 3 to the remote cloud-based computer system 4. The communication of the HVAC data reporting message is executed on a periodic basis or upon request from an internal or external control or application program, e.g. an external data request, received in step S5 from the cloud-based computer system 4, a mobile device 30, or another computing device. As described above, depending on embodiment and/or configuration, communication is performed through the communication system 3, either directly between the HVAC device 6, 6', 6" and the cloud-based computer system 4 or via a mobile device 30 or a messaging gateway as described above.

In step S7, the cloud-based computer system 4 generates remote diagnoses for an HVAC device 6, 6', 6", e.g. an HVAC actuator 2, 2' using HVAC data reporting messages received from a plurality of HVAC controllers 22. In an embodiment, the cloud-based computer system 4 further generates control values for the particular HVAC device 6, 6', 6" or HVAC actuator 2, 2', respectively, using HVAC data reporting messages received from a plurality of HVAC controllers 22, 22'. Furthermore, the cloud-based computer system 4 generates and stores key performance indicators (KPI) for individual HVAC devices 6, 6', 6" and/or for groups of HVAC devices 6, 6', 6", using the received HVAC data reporting messages.

In the present context, diagnosis goes beyond mere fault detection based on a direct comparison of a sensor reading to predetermined threshold value, but rather relates to the identification of the nature and probable cause of problems, failures, malfunctioning, and critical conditions of HVAC devices, 6, 6', 6", HVAC actuators 2,2' and associated HVAC system components, based on an analysis of a plurality of HVAC data reporting messages received from a plurality of HVAC controllers 22. In other words, a remote diagnosis is always derived and generated by the cloud-based computer system 4 using more than one operational data value or more than one sensor measurement value (raw data), respectively. Thus, an individual remote diagnosis is derived and generated by the cloud-based computer system 4 from operational data values included in HVAC data reporting messages received from more than one or the HVAC devices 6, 6', 6", HVAC actuators 2, 2', or wearables 8, respectively, and/or from at least two different types of operational data values, particularly, from sensor measurement values obtained from at least two different sensors 5a, 5b, 5c, 5d, 5e. The same applies to the optional control values.

For some diagnoses (and control values), the cloud-based computer system 4 further considers and uses location information of the HVAC devices 6, 6', 6", HVAC actuators 2, 2', and/or wearables 8. Depending on embodiment and/or configuration, the location information is included in the HVAC data reporting messages or the cloud-based computer system 4 determines the (static) location information based on device identification information included in the HVAC data reporting messages, e.g. using a location look-up table. The location information includes coordinates, location names, address, identification of an HVAC system, identification of a building, room, and/or floor, etc. The wearable 8 may include GPS position information.

As illustrated in FIG. 3, in step S71 the cloud-based computer system 4 receives and stores the HVAC data reporting messages and/or its contents assigned to an identifier of the originating HVAC device 6, 6', 6" or HVAC actuator 2, 2', and/or to a respective device type, actuator type, and/or model indicator.

In step 72, the cloud-based computer system 4 generates group reference values from the HVAC data reporting messages received from a plurality of controllers 22. The groups are defined depending on various criteria for the HVAC devices 6, 6', 6" or HVAC actuators 2, 2', respectively, such as device type, device configuration, firmware, location, duration of operation of the device, frequency of use (movements) of the device, type of application of the device, conditions of surrounding environment, climate and/or weather, etc. Examples of group reference values include actuator benchmark data indicative of functional performance levels of the HVAC devices 6, 6', 6" or HVAC actuators 2, 2', performance thresholds which define expected normal operations of the HVAC devices 6, 6', 6" or HVAC actuators 2, and/or operational end-of-life expectancies for HVAC devices 6, 6', 6" and associated components, including HVAC actuators 2, actuator components of the HVAC actuators 2, or actuator components connected to the HVAC actuators 2. The group reference values are generated though statistical evaluation and analysis of received operational data values from a plurality of HVAC controllers 22 over a long period of time (e.g. one or more years). The group reference values are provided as numerical values and/or as probability distributions. For example, probability distributions of functional performance levels and/or operational end-of-life expectancies, whereby the performance thresholds are derived from the probability distributions of functional performance levels.

In step S73, the cloud-based computer system 4 generates individual remote diagnoses (and control values) for a particular one of the HVAC devices 6, 6', 6", or HVAC actuators 2, 2', respectively, using a plurality of data reporting messages received from a plurality of the HVAC controllers 22 (and wearables 8, if applicable). Specifically, the cloud-based computer system 4 generates the remote diagnoses (and control values) for a particular HVAC device 6, 6', 6" or HVAC actuator 2, 2', using group reference values generated by the cloud-based computer system 4 and one or more data reporting messages received from the HVAC controller 22 associated with the particular HVAC device 6, 6', 6" or HVAC actuator 2, 2'. For example, by generating benchmark data for the HVAC devices 6, 6', 6", e.g. HVAC actuators 2, 2', the cloud-based computer system 4 provides a metric of performance for each of the HVAC devices 6, 6', 6", which is comparable to the other monitored HVAC devices 6, 6', 6". The benchmark diagnosis for a particular HVAC device 6, 6', 6" or HVAC actuator 2, 2' includes an individual performance indicator which indicates the particular device's performance compared to a group or all other devices monitored by the cloud-based computer system 4. An individual performance indicator of an HVAC device 6, 6', 6" or HVAC actuator 2, 2', respectively, is one of a set of various key performance indicators (KPI) defined for the respective type or group of HVAC devices 6, 6', 6". Based on historical and statistical analysis of the data included in the HVAC data reporting messages, the cloud-based computer system 4 determines the performance thresholds for expected normal operations of the HVAC device 6, 6', 6", as well as criteria and durations of operational end-of-life expectancies for HVAC devices 6, 6', 6" and their components, including HVAC actuators 2, 2', actuator components of the HVAC actuators 2, 2', actuator components connected to the HVAC actuators 2, 2', e.g. motors, gears, filters, dampers, valves, and supercaps or other electrical components. In accordance with the benchmarking data, the performance thresholds and operational end-of-life expectancies may depend on specific groups of HVAC devices 6, 6', 60" or HVAC actuators 2, 2', as described above. A performance diagnosis indicative of an HVAC device 6, 6', 6", e.g. an HVAC actuator 2, 2', operating outside the range of expected normal operations, i.e. an HVAC device 6, 6', 6" or HVAC actuator 2, 2' with a performance below one or more performance thresholds, may be generated by the cloud-based computer system 4 as a diagnosis message including an abnormal operations alert message. Similarly, an end-of-life diagnosis for an HVAC device 6, 6', 6" or an HVAC actuator 2, 2' or related HVAC system components may be generated by the cloud-based computer system 4 as a diagnosis message including an end-of-life alert message.

As illustrated schematically in FIG. 3, the individual diagnosis messages with remote diagnoses are transmitted from the cloud-based computer system 4 via the communication system 3 to a remote diagnosis processing system 7, i.e. a computer center or mobile device 30 assigned to the particular HVAC device 6, 6', 6" or HVAC actuator 2, 2'. The (optional) individual control values are transmitted from the cloud-based computer system 4 via the communication system 3 to the particular HVAC device 6, 6', 6" or HVAC actuator 2, 2', respectively.

As illustrated in FIG. 4, in step S7', the cloud-based computer system 4 further generates control values for a particular HVAC device 6, 6', 6", e.g. a particular HVAC actuator 2, 2', using HVAC data reporting messages received from one or more HVAC controllers 22 (and wearables 8, if applicable). In step S71 the cloud-based computer system 4 receives and stores the HVAC data reporting messages as described above. In step S74, the cloud-based computer system 4 detects oscillation of control or feedback signals in the HVAC system 1, associated with a set of one or more HVAC devices 6, 6', 6" or HVAC actuators 2, 2', using a plurality of HVAC data reporting messages received from respective HVAC controllers 22. In step S75, upon detection of oscillation, the cloud-based computer system 4 determines control parameters for attenuating the oscillation (e.g. adapted control parameters or filter parameters for a lead/lag filter). In step S76, the cloud-based computer system 4 transmits the control parameters as control values to the HVAC controller 22, 22' of the particular one or more HVAC devices 6, 6', 6" or actuators 2, 2', respectively.

The following paragraphs describe various examples of diagnoses derived and generated in and by the cloud-based computer system 4 from operational data values received in HVAC data reporting messages from the HVAC controllers (and wearables 8, if applicable).

Figure 6:
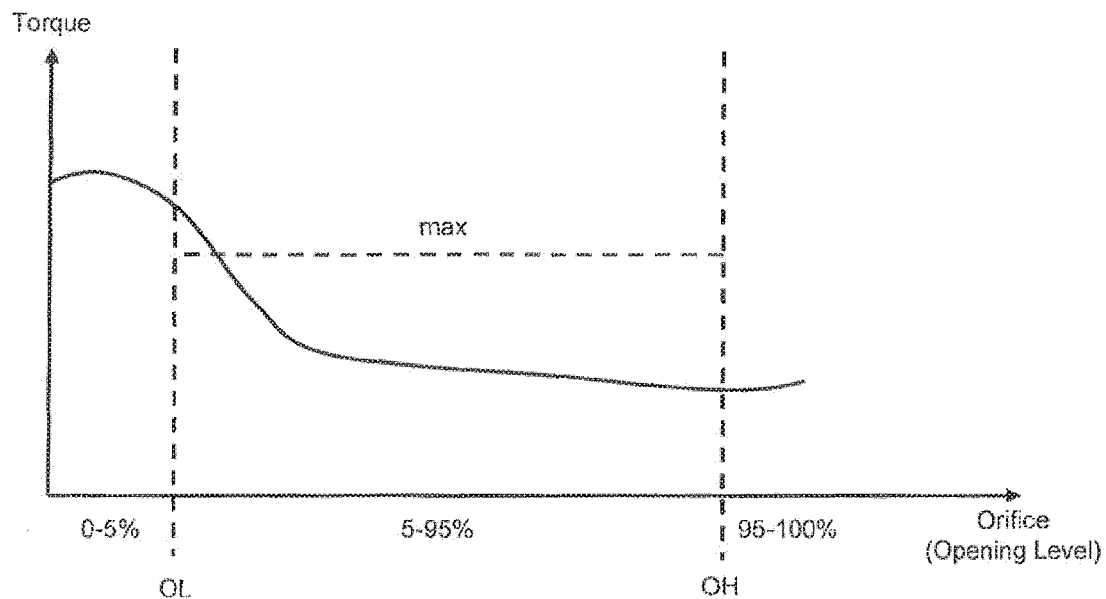
FIG. 6: shows a graph illustrating a histogram of torque values recorded for an actuator at different positions of an actuated part.

From motor current (or torque) levels in combination with position information of the motor 20 or the actuated part 200, respectively, the cloud-based computer system 4 derives and generates diagnoses of mechanical problems, e.g. if a maximum motor current or torque value is reached within a defined range of actuated positions (possible blockage). In other words, a diagnosis that the actuator 2, 2', its linkage to an actuated part 200, and/or its actuated part 200 have a mechanical problem is generated by the cloud-based computer system 4, based on present motor current (or torque) and position values, when these values are compared to respective established group reference values, i.e. to performance thresholds defining a maximum motor current (or torque) value at the respective position for a related group of actuators 2, 2', e.g. of the same type, same or similar application and configuration, etc. For example, from the measured motor current, the HVAC controller 22 of the HVAC actuators 2, 2', or the cloud-based computer system 4 generates a local or remote data processing result, respectively, that indicates, corresponding to a trailing pointer, the maximum torque value in a defined range of position of an actuated part 200, 200' actuated by the HVAC actuators 2, 2', e.g. as illustrated in FIG. 6, in the range between a lower opening level OL, e.g. at 5% (or 5°), and an upper opening level OH, e.g. at 95% (or 85°), of a valve or damper operating between 0% and 100% (0° and 90°) range of orifice. In an embodiment, the maximum torque values are determined for various sub-ranges, e.g. for sub-ranges of 10% (10°), i.e. sub-ranges [5%-15%], [15%-25%], [25%-35%], ..., [3%-15%]. In these examples, the cloud-based computer system 4 determines for these positional ranges the individual performance indicators of a particular actuator 2, 2' as well as the respective group reference values. The cloud-based computer system 4 derives and generates further diagnoses of mechanical problems, if a minimum value of motor current or torque value is reached at the end position (changed characteristics of rubber sealing at end position, beware of leakage), if a maximum value of motor current or torque value is reached at the end position (changed characteristics of rubber sealing at end position, beware of leakage), or if the actuated position is changed at the end position (changed characteristics of rubber sealing at end position, beware of leakage).

A diagnosis that the HVAC device 6, 6', 6" or HVAC actuator 2, 2' has been used for too long outside the specified operating conditions is generated by the cloud-based computer system 4, based on the count or duration of excessive high motor temperature, excessive low motor temperature, minimum PCB temperature, maximum PCB temperature, maximum voltage reached (outside power up/down period), when compared to respective established group reference values.

A diagnosis that the HVAC device 6, 6', 6" or HVAC actuator 2, 2' or its motor or other specific components, respectively, have or are expected to soon receive their expected end-of-life is generated by the cloud-based computer system 4, based on the count of active/operating time periods (replacement should be considered), when compared to respective established group reference values. The same diagnosis may be generated by the cloud-based computer system 4, based on other environment and device parameters, such as temperature, relative humidity, usage of hand crank, internal/external voltage, torque distribution, angle distribution, voltage surge, number of cycles, number of part cycles, operating hours, etc., when compared to respective established group reference values.

A diagnosis that the power supply of the HVAC device 6, 6', 6" or HVAC actuator 2, 2' is in bad condition or of bad quality is generated by the cloud-based computer system 4, based on the count power fails, when compared to respective established group reference values of power fails.

A diagnosis that the type/size of the HVAC device 6, 6', 6" or HVAC actuator 2, 2' has been incorrectly selected for its present application is generated by the cloud-based computer system 4, based on the count of excessive motor current, excessive power, and/or excessive motor or PCB temperature, when compared to respective established group reference values for these measures.

A diagnosis that the HVAC device 6, 6', 6" or HVAC actuator 2, 2' is running with bad system stability (hunting) is generated by the cloud-based computer system 4, based on a high count of start/stop cycles within a defined short period of time, and/or a high count of change of directions within a defined short period of time, when compared to respective established group reference values for these measures.

A diagnosis that the HVAC controller 22, 22' is running with an instable/outdated firmware/software is generated by the cloud-based computer system 4, based on a high count of watchdog resets, when compared to respective established group reference values for the number of watchdog resets.

A diagnosis of a need of a change of air filter is generated by the cloud-based computer system 4, based on an increased differential pressure over the air filter, when compared to respective established group reference values for this pressure measure.

A diagnosis that the HVAC device 6, 6', 6" or HVAC actuator 2, 2' and/or its actuated parts 200, 200' show an increased or deteriorated system hysteresis, and thus signs of severe aging, is generated by the cloud-based computer system 4, based on detection of an increased (deteriorated) system hysteresis $H^D$ (see FIGS. 11 and 12), when compared to respective established group reference values and/or previous values of system hysteresis H determined and recorded in the past for the respective HVAC device 6, 6', 6" or HVAC actuator 2, 2'. A diagnosis of increased system hysteresis is generated, for example, when the increase of system hysteresis exceeds a defined threshold, e.g. a defined percentage of previous system hysteresis values. The system hysteresis H, $H^D$ is determined by the cloud-based computer system 4 based on the measurement values of the motor current i (or motor torque) of the electric motor 20 of the respective HVAC device 6, 6', 6' or HVAC actuator 2, 2', and motor movement information, e.g. motor rotations, motor direction, and/or position of an actuated part 200 actuated by the motor 20. Specifically, the system hysteresis H, $H^D$ is determined by the cloud-based computer system 4 based on the course of motor current i or torque during directional changes of the motor 20, whereby play and consequently hysteresis H, $H^D$ is indicated by a reduced torque or motor current i during the change of direction, until the torque or motor current i increases upon engaged actuation of the actuated part actuated by the motor, i.e. when the play between motor 20 and actuated part 200 ends and the motor 20 meets the resistance of the actuated part 200 and actually actuates and moves the actuated part 200.

Figure 11:
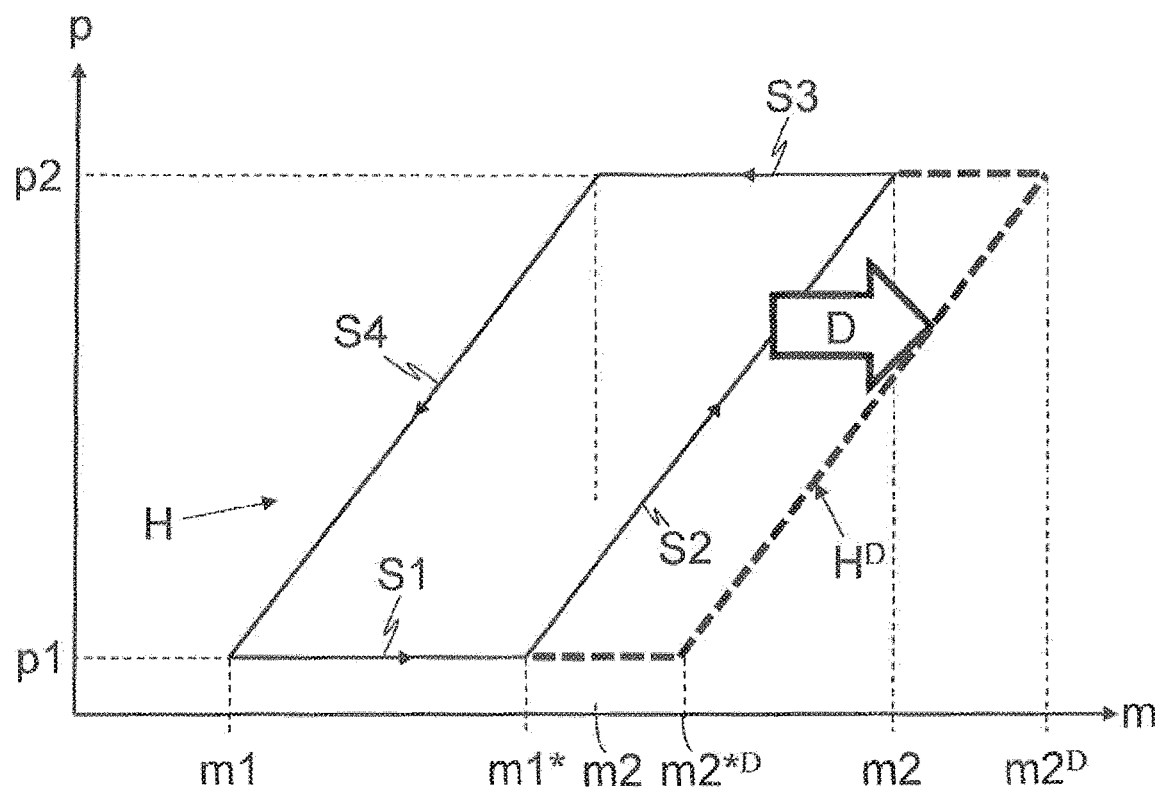
FIG. 11: shows a graph illustrating a system hysteresis of an actuator coupled to an actuated part, the system hysteresis reflecting changes of directions when the actuator moves the actuated part between two positions.

FIG. 11 illustrates in a graph the hysteresis H of an actuator system including actuator 2 and actuated part 200. The system hysteresis H reflects the delayed response of the movement of the actuated part 200 to changes in direction of the movement (rotations) of the electric motor 20. On the x-coordinate, FIG. 11 shows the position m of the electric motor 20 in terms of motor rotations. On the y-coordinate, FIG. 11 shows the position p of the actuated part 200 in terms of an angle or a relative distance. As illustrated in FIG. 11, in step S1, the electric motor 20 changes its direction and rotates in a positive direction (e.g. clockwise), increasing the number of (partial or full) rotations from an initial value or motor position of m1 rotations to a value or motor position of m1*. Owing to the delayed response of movement of the actuated part 200 because of play, during the rotations of the electric motor 20 from the motor position m1 to m1*, the actuated part 200 does not change its position p and remains at position p1. In step S2, the electric motor 20 keeps rotating in the same direction as in step S1; however, the actuated part 200 is now being moved by the electric motor 20 and changes its position p. As illustrated in FIG. 11, in step S2 the actuated part 200 moves from its initial position p1 to the new position p2 when the electric motor 20 has rotated or moved to motor position m2. In step S11, the electric motor 20 reverses its direction (e.g. counter clockwise), decreasing the (partial or full) number of rotations from a value or motor position of m2 rotations to a value or motor position of m2*. Again, owing to the delayed response of movement of the actuated part 200 because of play, during the rotations of the electric motor 20 from the motor position m2 to m2*, the actuated part 200 does not change its position p and remains at position p2. In step S4, the electric motor 20 keeps rotating in the same direction as in step S3; however, the actuated part 200 is now being moved by the electric motor 20 and changes its position p. As illustrated in FIG. 11, in step S4 the actuated part 200 moves from its position p2 to the new position p1 when the electric motor 20 has rotated or moved back to motor position m1. The system hysteresis H may vary over time with changes in play and depends on various factors such as tolerances and/or wear and tear of mechanical components of the actuator 2, the coupling arrangement, and the actuated part 200, as well as on influences of temperature and/or moisture on these and other components, such as lubricants.

Figure 12:
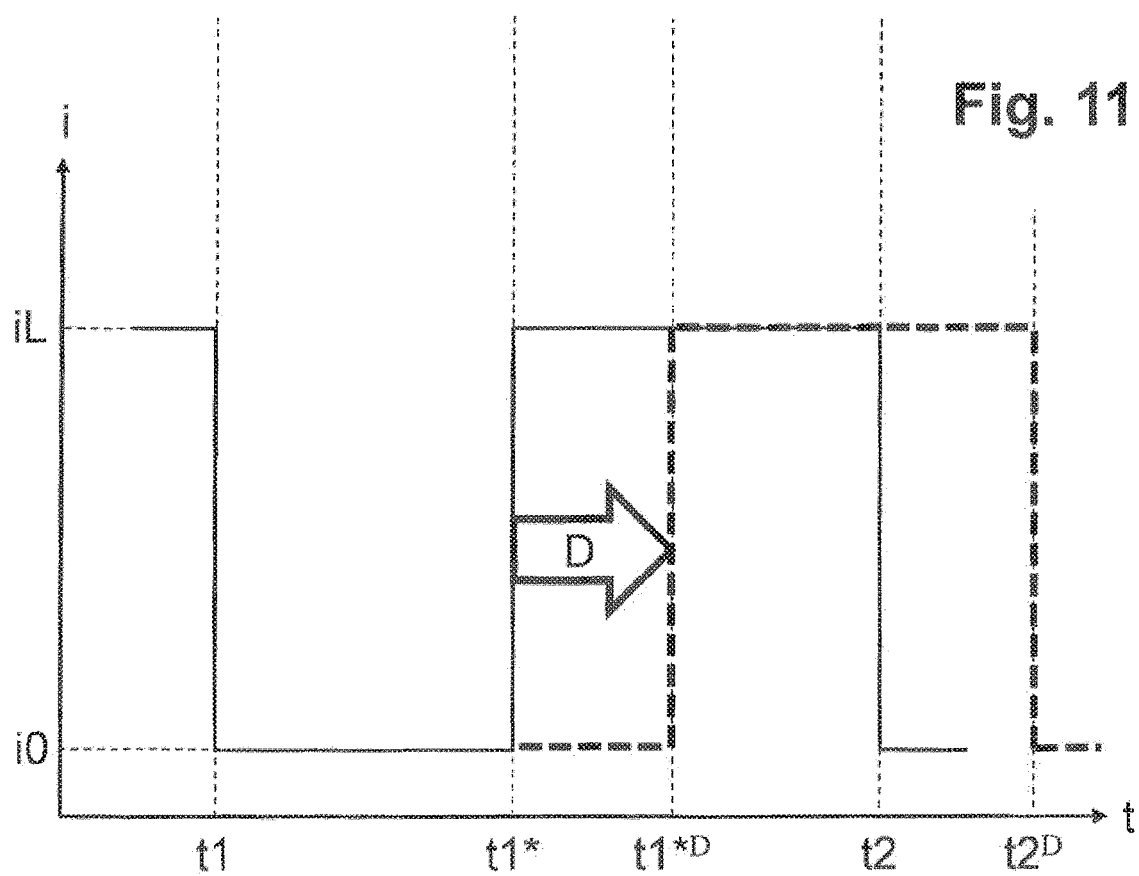
FIG. 12: shows a graph illustrating the system hysteresis with the temporal course of the motor current while the actuator changes the direction of movement of the actuated part.

FIG. 4 illustrates in a graph the temporal course of the motor current i while the electric motor 20 and the actuated part 200 perform the movements described above in connection with the system hysteresis H. As shown in FIG. 12, from the point in time t1 up to the point in time t1*, i.e. during step S1, the motor current i is at a low level i0, indicative of a minimum torque with barely any toad on the electric motor 20. Subsequently, from the point in time t1* up to the point in time t2, i.e. during step S2, the motor current i is at a comparatively higher level iL, indicative of a load torque that corresponds to the full load of the actuated part 200 on the electric motor 20. Subsequently, the course of the motor current i would be at the low level i0, without any significant load of the actuated part 200 onto the electric motor 20 during step S3, and at the high level iL, with the full load of the actuated part 200 on the electric motor 20 during step S4.

In FIGS. 11 and 12, the arrows referenced by numeral D indicate schematically an increase (deterioration) of system hysteresis $H^D$ from previous system hysteresis H. As indicated in FIG. 11 by reference numerals $m2*^D$ and $m2^D$, the increased hysteresis $H^D$ has an increased delay in the response of the movement of the actuated part 200 to changes in direction of the movement (rotations) of the electric motor 20. Correspondingly, as illustrated schematically in FIG. 12, there is an increased delay in time, from t1* to $t1*^D$, for the motor current i to raise from the low level i0, indicative of a minimum torque, to the comparatively higher level iL, indicative of a load torque that corresponds to the full load of the actuated part 200 on the electric motor 20.

A diagnosis of system (fluid) leakage is generated by the cloud-based computer system 4, based on a measured fluid flow rate φ when the valve actuated by the respective HVAC actuator 2, 2' is closed.

A diagnosis of a left open door or window is generated by the cloud-based computer system 4, based on the use of energy when compared to the recorded use of energy over time for the respective facility. The use of energy is computed by the cloud-based computer system 4 based on fluid flow rate φ and fluid temperatures T1, T2 at the entry and exit of a heat exchanger X through which the fluid flow φ is controlled by a valve 12 operated by the respective HVAC actuator 2, 2'.

A diagnosis relating to the quality of control is generated by the cloud-based computer system 4, based on comparative results (e.g. difference) between actual position and setpoint position of the HVAC actuator's motor 20 or actuated part 200, when compared to respective established group reference values for such comparisons (differences).

A diagnosis about changing glycol concentration is generated by the cloud-based computer system 4, based on measurement values of glycol concentration of a fluid flowing through a valve operated by the respective HVAC actuator 2, 2', when compared to a time series of recorded glycol concentration and respective established group reference values. Thus, an operator can be warned ahead of time that glycol concentration is soon expected to reach a minimum level and must be replenished (alternatively or in addition the cloud-based computer system 4 generates and transmits a glycol refill control message to an automated glycol refill apparatus).

A diagnosis relating to normal or abnormal operating behavior of an HVAC system 1 is generated by the cloud-based computer system 4, based on a building's internal temperature and the external temperature outside the building, when compared to time series of tuples of the internal and external temperatures and respective established group reference values, e.g. based on buildings in the neighborhood or close proximity.

A diagnosis relating to non-satisfactory operating behavior of an HVAC system 1, outside personal comfort zone(s), is generated by the cloud-based computer system 4, based on the HVAC data reporting messages received from one or more wearables 8 located in the same room, floor, or building and including sensor measurement values indicative of the respective wearer's (user's) personal discomfort, e.g. increased transpiration owing to uncomfortably high room temperatures, cold body/skin temperature owing to uncomfortably low room temperature, etc.

A diagnosis relating to abnormal operating behavior of a sensor is generated by the cloud-based computer system 4, based on plausibility tests applied to the respective operational data values or sensor measurement values, comparisons to recorded operational data values or sensor measurement values (behavior over time), and consideration of respective established group reference values.

A diagnosis indicating potential energy savings is generated by the cloud-based computer system 4, based on current temperature values and lower hypothetical temperature setpoint values (e.g. reduced by 1° C. or 2° C.), using historical data room temperatures and associated energy consumption as well as respective established group reference values. Another diagnosis enabling energy savings indicates valves 12 that are often (e.g. more than 50% of the time) in a low or nearly closed position resulting in an inefficient and energy wasting performance. Such a diagnosis is generated by the cloud-based computer system 4, based on recorded positions of motors 20 or actuated parts 200 of associated valves 12 or dampers. Consequently, users can be informed about potential energy savings with a reduction of their room temperature, in the first case, or a reduction of pump speed or water supply temperature, in the second case.

A diagnosis indicating a valve with a bad valve authority is generated by the cloud-based computer system 4, using recorded flow rates and associated valve positions to determine the valve authority as the ratio between the pressure drop across the valve to the total pressure drop across the whole fluid transporting system 10 of the HVAC system 1. For example, the cloud-based computer system 4 computes the flow capacity values of the fluid transporting system 10 of the HVAC system 1 using a plurality of recorded flow rates and associated valve positions as characteristic hydraulic network parameters of the fluid transporting system 10, and then determines the pressure drop across the valve and the total pressure drop across the whole fluid transporting system 10. The diagnosis indicating a valve with a bad valve authority is generated by the cloud-based computer system 4, based on a comparison or the calculated valve authority to a defined minimum authority threshold value and/or a respective established group reference values.

A diagnosis relating to abnormal operation (not working) of a pump 11 of an HVAC system 1 is generated by the cloud-based computer system 4, based on measured fluid flow rates and valve positions of valves actuated by the respective HVAC actuators 2, 2', when there is now flow at open valve positions of valves of the same fluid transporting system 10, as indicated by the HVAC data reporting messages, received from a plurality of HVAC controllers 22 of the respective HVAC actuators 2, 2' from the same fluid transporting system 10 (determined from location information of the respective HVAC actuators 2, 2').

Another example of a location-specific diagnosis indicates a blocked fluid transporting system 10, e.g. a clogged pipe, and is generated by the cloud-based computer system 4, based on current temperature values and temperature setpoint values, when the HVAC data reporting messages, received from a plurality of HVAC controllers 22 of the respective actuators 2, 2' from the same floor or zone, all indicate a deviation of actual temperature values from temperature setpoint values, without any particular external temperature influence that could explain the deviation.

It should be noted that, in the description, the sequence of the steps has been presented in a specific order, one skilled in the art will understand, however, that the computer program code may be structured differently and that the order of at least some of the steps could be altered, without deviating from the scope of the invention.

The invention claimed is:

1. A method of monitoring an HVAC system, the HVAC system comprising a plurality of HVAC devices and a plurality of HVAC controllers, each of the HVAC controllers comprising a communication module, the method comprising:

receiving and storing in a cloud-based computer system HVAC data reporting messages, each HVAC data reporting message including one or more operational data values included by one of the HVAC controllers; wherein said one or more operational data values are stored by the plurality of HVAC controllers, depending on operation data type, as at least one of:
  a series in a sequence of consecutive operational data values,
  maximum and minimum operational data values, and
  accumulated values indicative of a duration/a count of occurrences of events or actions, and
  wherein the data reporting messages are generated by the plurality of HVAC controllers based on said one or more operational data types on an ongoing or periodic basis or in response to one or more internal or external requests;

generating by the cloud-based computing system group reference values from the HVAC data reporting messages received from the plurality of HVAC controllers of a plurality of HVAC systems, where each group is defined in accordance with predetermined criteria comprising one or more of device type, device configuration, firmware, location, duration of operation of the device, frequency of use (movements) of the device, type of application of the device, conditions of surrounding environment, climate and/or weather, the group reference values being generated through statistical evaluation and analysis of received operational data values from the plurality of HVAC controllers;

generating by the cloud-based computer system remote diagnoses for a selected HVAC device of the plurality of HVAC devices in the HVAC system, using at least one of the HVAC device group reference values and at least one HVAC data reporting message related to the selected HVAC device, wherein each remote diagnosis is generated by using more than one operational data value;

generating by the cloud-based computer system control value(s) for the selected HVAC device, using a plurality of data reporting messages received from a plurality of HVAC controllers, wherein each control value is generated by using more than one operational data value;

transmitting by the cloud-based computer system of a diagnosis message to a diagnosis processing system for the selected HVAC device, the diagnosis message including a remote diagnosis for the selected HVAC device; and transmitting by the cloud-based computer system a control message to the selected HVAC device, the control message including the control value(s) for the selected HVAC device, wherein the control value(s) are implemented by the selected HVAC device.

2. The method of claim 1, wherein
the HVAC controllers include in the HVAC data reporting messages at least two different types of operational data values; and
the cloud-based computer system generates the remote diagnosis for the particular HVAC device by using at least the two different types of operational data values from the HVAC controllers.

3. The method of claim 1, wherein
the HVAC controllers include in the HVAC data reporting messages sensor measurement values from at least two different sensors connected to the respective HVAC controller; and
the cloud-based computer system generates the remote diagnosis for the selected HVAC device by using sensor measurement values from at least two different sensors connected to the HVAC controller.

4. The method of claim 1, wherein
the cloud-based computer system determines location information for the plurality of HVAC devices; and
the cloud-based computer system generates the remote diagnosis for the selected HVAC device by further using location information of the HVAC devices.

5. The method of claim 1, wherein
the cloud-based computer system determines HVAC device benchmark data indicative of functional performance levels of the plurality of HVAC devices, using a plurality of the HVAC data reporting messages received from a plurality of HVAC controllers of the HVAC system and one or more other HVAC systems;
the cloud-based computer system determines an individual performance indicator for the selected HVAC device using the HVAC device benchmark data and at least one HVAC data reporting message related to the selected HVAC device; and
the cloud-based computer system transmits a diagnosis message to a diagnosis processing system for the selected HVAC device, depending on the individual performance indicator of the selected HVAC device.

6. The method of claim 1, wherein
the cloud-based computer system determines for the plurality of HVAC devices performance thresholds which define expected normal operations of the plurality of HVAC devices, using a plurality of HVAC data reporting messages received from a plurality of HVAC controllers of the HVAC system and one or more other HVAC systems;
the cloud-based computer system identifies a selected HVAC device which operates outside the expected normal operations defined by the performance thresholds, using one or more HVAC data reporting messages related to the selected HVAC device; and
the cloud-based computer system generates and transmits an abnormal operations alert message to the diagnosis processing system responsible for the selected HVAC device.

7. The method of claim 1, wherein
the cloud-based computer system determines operational end-of-life expectancies for HVAC device components of the plurality of HVAC devices or for HVAC device components connected to the plurality of HVAC devices, using a plurality of HVAC data reporting messages received from a plurality of HVAC controllers of the HVAC system and one or more other HVAC systems;
the cloud-based computer system identifies an HVAC device component which has reached its operational end-of-life expectancy, using one or more HVAC data reporting messages related to the particular HVAC device comprising or being connected to the respective HVAC device component; and
the cloud-based computer system generates and transmits an end-of-life alert message to a diagnosis processing system responsible for the respective HVAC device component or HVAC device.

8. The method of claim 1, wherein
the cloud-based computer system detects oscillation of control or feedback signals, using a plurality of HVAC data reporting messages received from HVAC controllers of a selected HVAC system, and
upon detection of oscillation, the cloud-based computer system determines control parameters for attenuating the oscillation and transmits the control parameters to one or more HVAC controllers of the selected HVAC system.

9. The method of claim 1, wherein
at least some of the operational data values relate to operational parameters of an electric motor of an HVAC actuator, the operational parameters of the electric motor relating to at least one of: motor current of the electric motor, voltage levels of a power supply of the electric motor, temperature of the electric motor, and movement of the electric motor, including at least one of: number of rotations, number of changes of direction, powered-on operating time, active operating time, number of starts, number of stops, and start/stop ratio.

10. The method of claim 1, wherein at least some of the operational data values relate to positions of actuated parts actuated by HVAC actuators.

11. The method of claim 1, wherein at least some of the operational data values relate to sensor measurements values regarding a fluid moving through a valve controlled by an HVAC actuator, including at least one of: flow rate, temperature values, and differential pressure values.

12. The method of claim 1,
wherein the group reference values comprise HVAC device benchmark data indicative of functional performance levels of the HVAC devices, using a plurality of the HVAC data reporting messages received from a plurality of HVAC controllers of a plurality of HVAC systems,
wherein; the cloud-based computer system determines an individual performance indicator for the particular HVAC device, using the HVAC device benchmark data and at least one HVAC data reporting message related to the particular HVAC device, and
wherein the cloud-based computer system transmits a diagnosis message to a diagnosis processing system for the particular HVAC device, depending on the individual performance indicator of the particular HVAC device.

13. A computer system for monitoring an HVAC system, the HVAC system comprising a plurality of HVAC devices and a plurality of HVAC controllers, each of the HVAC controllers comprising a communication module, wherein the computer system is a cloud-based computer system comprising one or more processors configured to:

receive and store in the cloud-based computer system HVAC data reporting messages from the plurality of HVAC controllers, each HVAC data reporting message including one or more operational data values included by the respective controller, wherein said one or more operation data values are stored by the plurality of HVAC controllers (22) depending on operation data type:
  as a series in a sequence of consecutive operational data values;
  as maximum and minimum operational data values; and/or
  as accumulated values indicative of a duration/ a count of occurrences of events or actions; and wherein the reporting messages are generated by the plurality of HVAC controllers based on said one or more operation data types on an ongoing or periodic basis or in response to one or more internal or external requests;

generate group reference values from the HVAC data reporting messages received from the plurality of HVAC controllers, of a plurality of HVAC systems, where each group is defined in accordance with predetermined criteria comprising one or more of device type, device configuration, firmware, location, duration of operation of the device, frequency of use (movements) of the device, type of application of the device, conditions of surrounding environment, climate and/or weather, the group reference values being generated through statistical evaluation and analysis of received operational data values from the plurality of HVAC controllers;

generate remote diagnoses for a selected HVAC device of the plurality of HVAC devices in the HVAC system, using at least one of the HVAC device group reference values and at least one HVAC data reporting message related to the selected HVAC device wherein each remote diagnosis is generated by using more than one operational data value;

generate control value(s) for the selected HVAC device, using a plurality of data reporting messages received from a plurality of HVAC controllers, wherein each control value is generated by using more than one operational data value;

transmit a diagnosis message to a diagnosis processing system for the selected HVAC device, the diagnosis message including a remote diagnosis for the selected HVAC device; and transmit a control message to the selected HVAC device, the control message including the control value(s) for the selected HVAC device, wherein the control value(s) are implemented by the selected HVAC device.

14. The computer system as recited in claim 13, wherein the group reference values comprise HVAC device benchmark data indicative of functional performance levels of the HVAC devices, using a plurality of the HVAC data reporting messages received from a plurality of HVAC controllers of a plurality of HVAC systems, wherein; the cloud-based computer system determines an individual performance indicator for the particular HVAC device, using the HVAC device benchmark data and at least one HVAC data reporting message related to the particular HVAC device, and wherein the cloud-based computer system transmits a diagnosis message to a diagnosis processing system for the particular HVAC device, depending on the individual performance indicator of the particular HVAC device.

* * * * *